(12) United States Patent
Melton et al.

(10) Patent No.: US 9,731,915 B1
(45) Date of Patent: Aug. 15, 2017

(54) LOADING ARM WITH HATCH PLATE FOR TOP HATCH OF TRANSPORT TANK

(75) Inventors: Allan J. Melton, Timmonsville, SC (US); Douglas S. Parris, Florence, SC (US); Ronald W. Bennett, Florence, SC (US)

(73) Assignee: SAM CARBIS ASSET MANAGEMENT, LLC, Florence, SC (US)

( * ) Notice: Subject to any disclaimer, the term of this patent is extended or adjusted under 35 U.S.C. 154(b) by 798 days.

(21) Appl. No.: 13/616,138

(22) Filed: Sep. 14, 2012

(51) Int. Cl.
*B65G 53/40* (2006.01)
*B65G 67/06* (2006.01)
*B65G 11/02* (2006.01)

(52) U.S. Cl.
CPC ............ *B65G 53/40* (2013.01); *B65G 11/026* (2013.01); *B65G 67/06* (2013.01)

(58) Field of Classification Search
CPC ...... B65G 53/40; B65G 11/026; B65G 67/06; Y10T 137/8807; Y10T 137/9847; Y10T 137/6866
USPC ............... 137/615, 800, 347; 141/382, 387; 105/328, 377.01, 377.06, 377.07, 377.08; 220/378, 327; 771/615, 800, 347
See application file for complete search history.

(56) References Cited

U.S. PATENT DOCUMENTS

| | | | |
|---|---|---|---|
| 3,126,591 A * | 3/1964 | Hamilton | ..................... 49/489.1 |
| 3,155,052 A | 11/1964 | Carney, Jr. | |
| 3,251,487 A | 5/1966 | Giesking | |
| 4,121,616 A | 10/1978 | Lochte et al. | |
| 4,290,463 A | 9/1981 | DeGeorge et al. | |
| 4,371,136 A | 2/1983 | Clay | |
| 4,388,948 A | 6/1983 | Carminati et al. | |
| 4,411,290 A | 10/1983 | Heath | |
| 4,758,970 A | 7/1988 | Keary et al. | |
| 4,987,925 A | 1/1991 | Vroonland | |
| 4,998,560 A | 3/1991 | Le Devehat | |
| 5,622,117 A | 4/1997 | Burian et al. | |
| 5,738,396 A | 4/1998 | Oestermeyer et al. | |
| 6,050,199 A * | 4/2000 | Anderson | ............. B61D 17/16 105/377.07 |
| 6,092,471 A | 7/2000 | Early | |
| 6,494,338 B1 * | 12/2002 | Schultz | ......................... 220/328 |
| 6,609,873 B2 | 8/2003 | Just et al. | |
| 6,843,511 B2 | 1/2005 | Barry | |
| 7,147,022 B2 | 12/2006 | Le Devehat | |
| 8,060,264 B2 * | 11/2011 | Oestermeyer | ............ B61D 5/08 105/248 |
| 8,166,891 B2 * | 5/2012 | Borowski et al. | ........ 105/377.05 |
| 8,196,523 B2 * | 6/2012 | Blevins, Jr. | .............. 105/377.08 |
| 8,272,527 B2 * | 9/2012 | Horn | ............................. 220/324 |

* cited by examiner

*Primary Examiner* — Michael R Reid
(74) *Attorney, Agent, or Firm* — Dority & Manning, P.A.

(57) ABSTRACT

A loading arm that transfers flowing bulk material from a storage vessel and into a transport tank through a top hatch of the transport tank that is carried on a truck or rail car for transport includes an articulating arm having a plurality of connected hollow pipes. A hatch plate connected to the discharge of the aim and defines a top member, a bottom member and an outer edge connecting the top and bottom members. At least one of the bottom member and the outer edge of the hatch plate defines a resiliently flexible section configured to deform upon engaging with the top hatch of the transport tank.

21 Claims, 15 Drawing Sheets

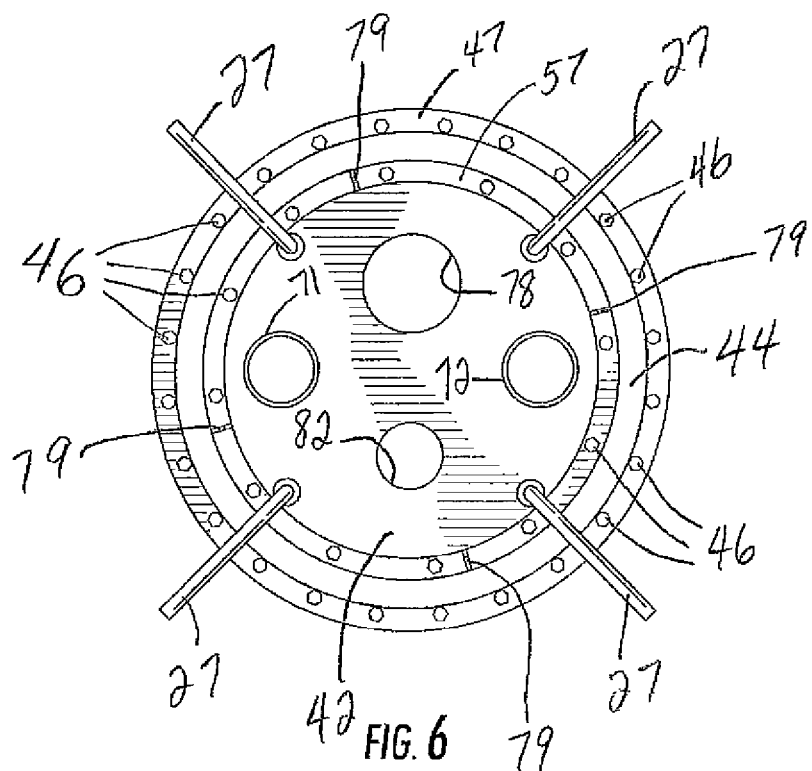

LOADING ARM WITH HATCH PLATE FOR TOP HATCH OF TRANSPORT TANK

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The subject matter disclosed herein generally involves loading arms and/or flexible hoses that transfer flowing material from a storage container into a transport tank carried on a truck or rail car for transport, and particularly to such arms and/or flexible hoses that load the material into the tank through a hatch in the top of the tank.

BACKGROUND OF THE INVENTION

Loading arms that transfer flowing material in bulk from a storage container 15 (shown in phantom in dashed line) into a transport tank (not shown in FIG. 1) carried on a truck or rail car (not shown in FIG. 1) for transport are known. Such conventional loading arms include an articulating aim that is depicted in FIG. 1 and designated generally by the numeral 16. An articulating arm 16 can weigh five or six hundred pounds or more and include a plurality of connected hollow pipes that pivotally articulate in several ways in order to position the arm's outlet 17 over the hatch in the top of the transport tank (not shown in FIG. 1) that is being loaded with fluid (typically a liquid) or fluidized solid material. As schematically shown in FIG. 1, the loading arm 16 can be provided with a mechanism 18 (e.g., a counter-balance spring, a pneumatic cylinder or an hydraulic cylinder) to lower portions of the arm 16 into the transport tank (not shown in FIG. 1) or lift those portions of the arm 16 out of the transport tank.

As schematically shown in FIG. 1, the conventional loading arm 16 can be provided with a hatch plate 19 that is intended to prevent vapors from escaping to the atmosphere during the loading of the bulk material into the transport tank (not shown in FIG. 1). Moreover, though not shown in FIG. 1, such a hatch plate 19 also can be attached to the discharge end of a flexible hose that is used to carry the bulk material being from storage into the transport tank (not shown in FIG. 1).

As shown in FIG. 1, a conventional hatch plate 19 can carry a level sensor 20 that projects partially above and partially beneath the hatch plate 19 and senses the level of the bulk material inside the transport tank (not shown in FIG. 1) so that the filling process can be halted before the bulk material overflows the top hatch of the transport tank. As shown in FIG. 1, a conventional hatch plate 19 can carry a vapor pipe 21 that projects partially above the hatch plate 19 and can be connected to a flexible vapor hose 22 that canes off vapor or dust that is given off by the bulk material being transported into the transport tank (not shown in FIG. 1) and allows the vapor or dust to be collected in an exhaust vessel 23 (shown in phantom in dashed line).

As shown in FIG. 1, an input product pipe 24 can extend beneath a conventional hatch plate 19 and project through the top hatch and into the transport tank (not shown in FIG. 1). As shown in FIG. 1, this input product pipe 24 can be provided with a telescoping extension tube 25 that can be selectively dropped down further into the transport tank (not shown in FIG. 1) in order to discharge the bulk material with less splash on the bottom of the transport tank. As shown in FIG. 1, this input product pipe 24 can be provided with one or more electrical ground cables 26 that prevent the buildup of static electricity during the process of filling the transport tank with bulk material.

As shown in FIG. 1, it is known to use a plurality of so-called "J" hooks 27 to secure such hatch plate 19 to the top hatch of a transport tank (not shown in FIG. 1) carried by rail car for example. Though not shown in FIG. 1, a plurality of bolts having one end pivotally connected to the hatch and the opposite end being threaded to receive a threaded nut can be received in slots formed in the peripheral edge of the hatch plate to secure same to the hatch. However, whether due to wear to the hatch or to the hatch plate 19, warping of same due to repeated temperature changes from weather or damage to one or both of them through repeated bumping during the process of aligning the arm's hatch plate 19 over the top hatch of the transport tank, gaps can develop between the hatch plate 19 and the top edge of the tank's hatch. Despite the use of such "J" hooks 27 (or bolt and nut fasteners), each such gap allows unwanted vapors or dust to escape to the atmosphere during the loading of the bulk material into the transport tank. Moreover, whether due to the operating limitations of the arm 16, uneven tracks beneath the rail car carrying the transport tank or a sloped grade beneath the truck carrying the transport tank, it is not always possible to get the pipe that supports the hatch plate 19 to address the hatch in the ideal alignment that is perpendicular to the plane of the top of the hatch. And the result of such misalignment is unwanted vapors or dust escaping to the atmosphere during the loading of the bulk material into the transport tank.

BRIEF DESCRIPTION OF THE DRAWINGS

Aspects and advantages of the invention are set forth below in the following description, or may be obvious from the description, or may be learned through practice of embodiments of the invention. Those of ordinary skill in the art will better appreciate the features and aspects of such embodiments, and others, upon review of the specification. A full and enabling disclosure of the present invention, including the best mode thereof to one skilled in the art, is set forth more particularly in this specification, including reference to the accompanying figures, in which:

FIG. 6 is a bottom plan view taken from the direction of the arrows 6-6 in FIG. 4.

Figure 1:
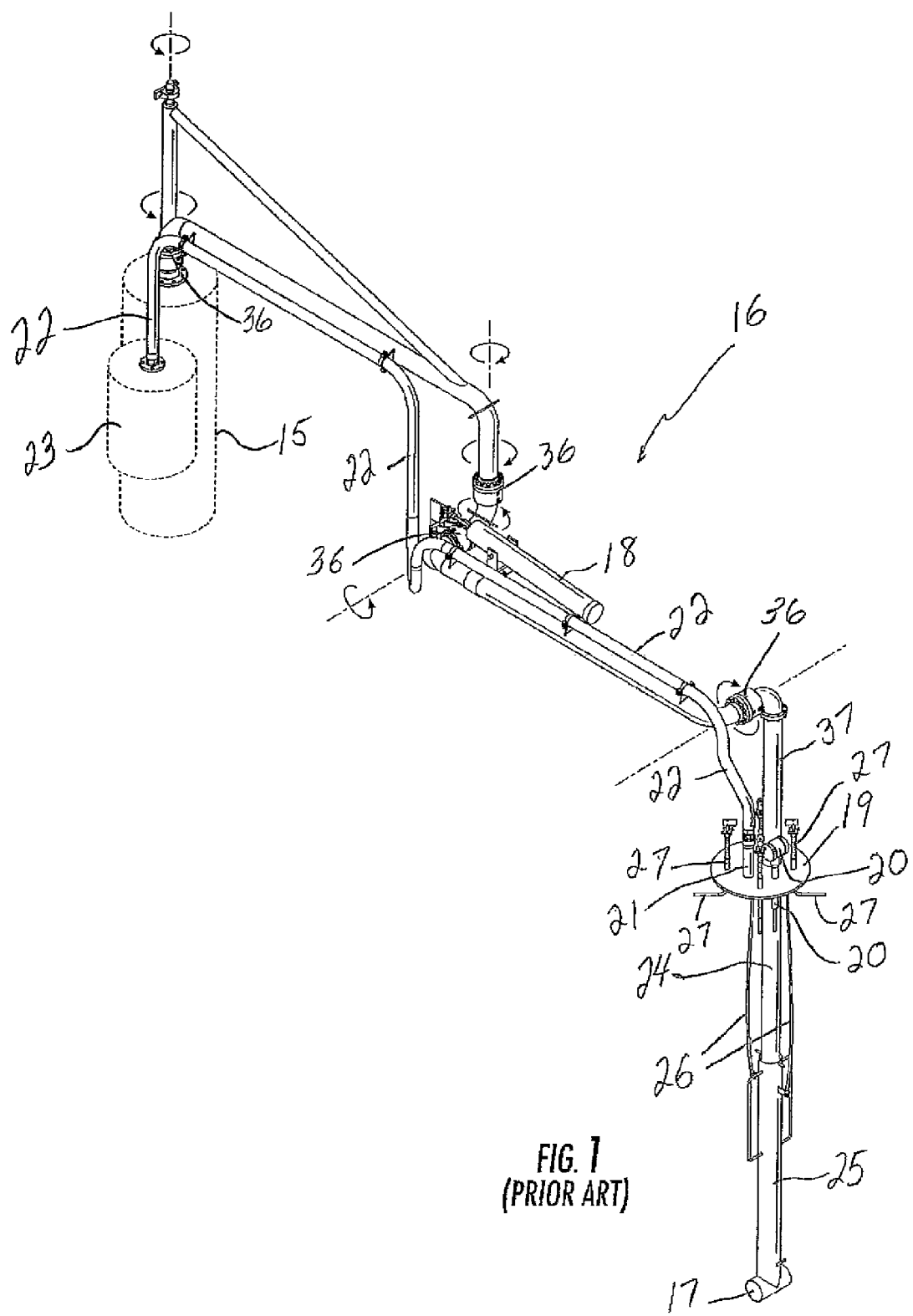
FIG. 1 is an elevated perspective view of a conventional loading arm that transfers flowing bulk material from a storage vessel shown in phantom in dashed line and draws off vapor into a reservoir shown in phantom in dashed line.

The accompanying drawings, which are incorporated in and constitute a part of this specification, illustrate at least one presently preferred embodiment of the invention as well as some alternative embodiments. These drawings, together with the written description, serve to explain the principles of the invention but by no means are intended to be exhaustive of all of the possible manifestations of the invention.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the structures.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

It is to be understood that the ranges and limits mentioned herein include all sub-ranges located within the prescribed limits, inclusive of the limits themselves unless otherwise stated. For instance, a range from 100 to 200 also includes all possible sub-ranges, examples of which are from 100 to 150, 170 to 190, 153 to 162, 145.3 to 149.6, and 187 to 200. Further, a limit of up to 7 also includes a limit of up to 5, up to 3, and up to 4.5, as well as all sub-ranges within the limit, such as from about 0 to 5, which includes 0 and includes 5 and from 5.2 to 7, which includes 5.2 and includes 7.

Figure 2:
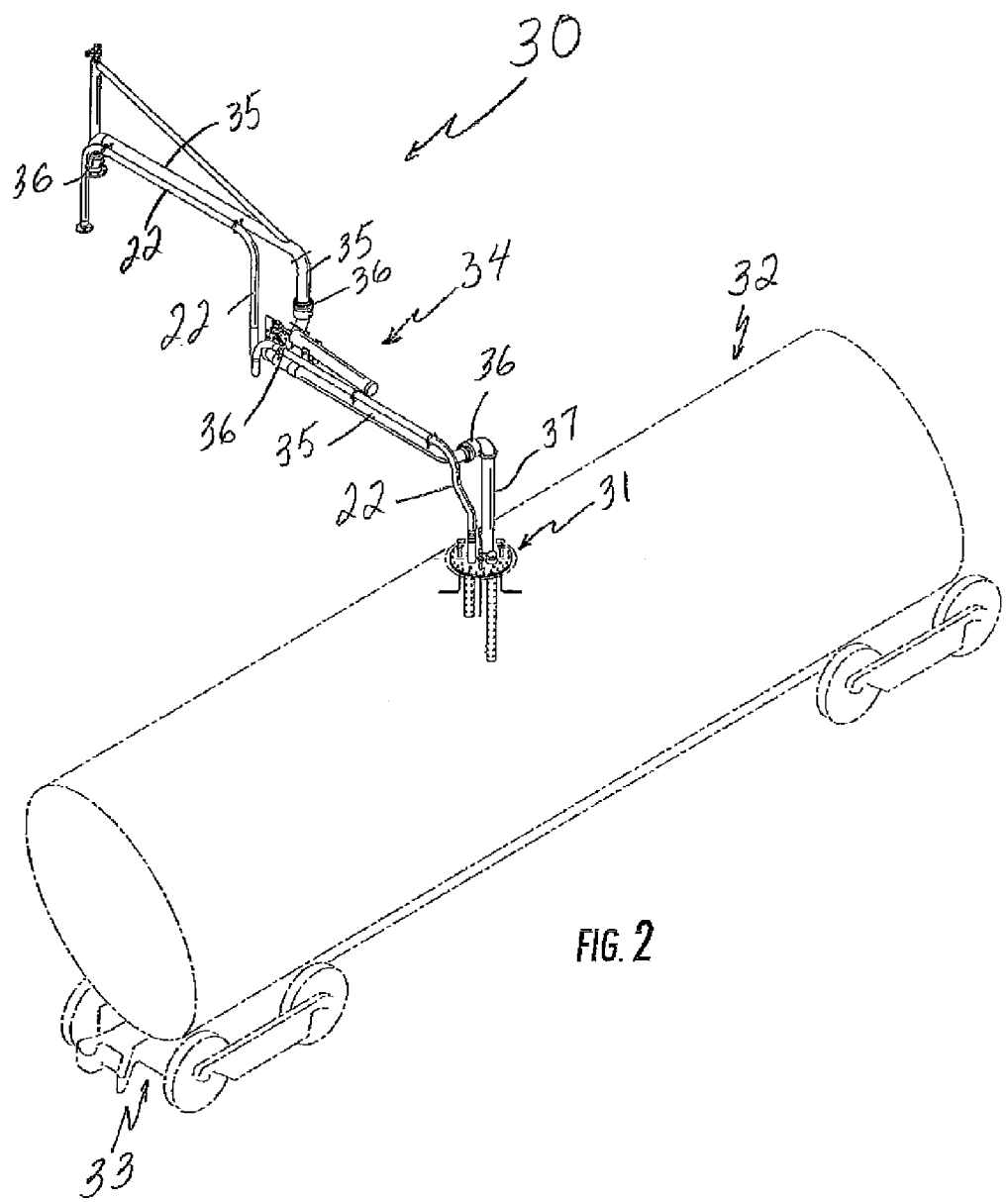
FIG. 2 is an elevated perspective view of an embodiment of a loading aim in accordance with the present invention that transfers flowing bulk material into a container shown in phantom in dashed line through a top hatch of the container that is carried on a truck or rail car shown in phantom in dashed line for transport.

One embodiment of the loading arm of the present invention is depicted in FIG. 2 and indicated generally by the numeral 30. FIG. 2 schematically illustrates an embodiment of the loading arm of the present invention with its hatch plate (indicated generally by the numeral 31) positioned over the entrance hatch in the top of a transport tank (schematically shown in phantom in chain-dashed line and indicated generally by the numeral 32) of a railcar (schematically shown in phantom in chain-dashed line and indicated generally by the numeral 33). The entrance hatch in the top of a transport tank 32 is the top hatch of the transport tank 32 and typically is a cylinder with a circular opening at each opposite end.

The articulating arm of a loading arm 30 is indicated generally by the numeral 34 in FIG. 2 and includes a plurality of connected hollow pipes 35. As in a conventional loading arm, successive ones of the hollow pipes 35 desirably are connected together so that one pipe 35 can pivot with respect to the other pipe 35 via a pivoting joint 36 that includes a rotatable bearing. The internal diameter of the hollow passages defined by the pipes 35 and pivoting connecting joints 36 is typically about 4 inches. The flowing bulk material that is to be transported through the hollow pipes 35 and pivoting connecting joints 36 typically is a liquid and often is a volatile liquid that gives off vapor at room temperatures. As in a conventional loading arm, the loading arm 30 of the present invention typically includes a flexible hose 22 that typically has an internal diameter of about 2 inches and carries off vapor that is given off by the bulk liquid material being transported into the transport tank 32. The horizontal reach of the loading arm 30 typically is on the order of 17½ feet to the center of the top member of the hatch plate 31 of the present invention.

The distal end of the articulating arm 34 of the loading aim 30 is the end farthest from the storage container 15 (FIG. 1) where the bulk material is stored prior to transfer via the loading arm 30 into the transport tank 32 carried on the truck or rail car 33. As shown in FIGS. 1 and 2 for example, the pipe of the articulating arm 34 at the distal end thereof defines a discharge pipe 37. This discharge pipe 37 defines at one end an outlet opening that is configured to be connected to the input product tube 24 that extends through the hatch plate 40, 50, 60 (see e.g., FIGS. 3, 7 and 11, respectively) and so permits the flowing bulk material to be discharged from the articulating aim 34 into the transport tank 32 via the top hatch of the transport tank 32.

Figure 3:
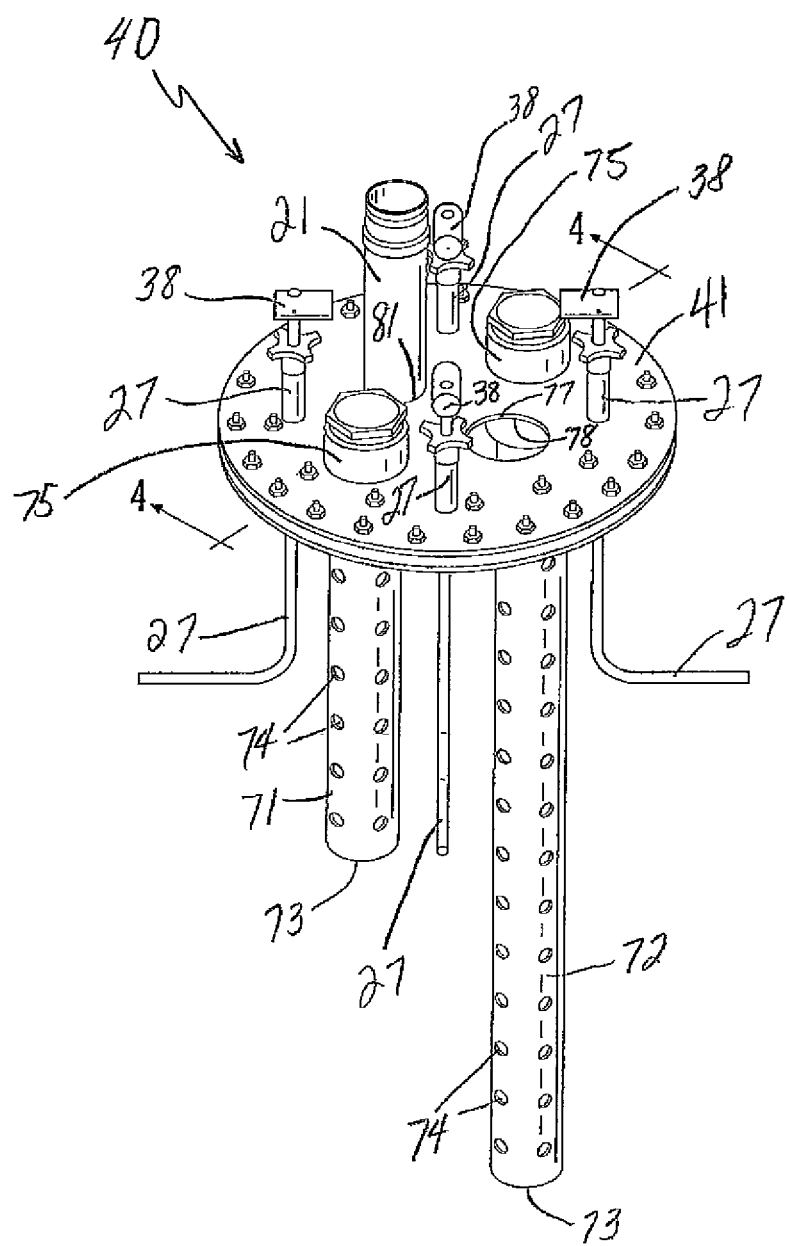
FIG. 3 is an elevated perspective view of an embodiment of a hatch plate in accordance with the present invention.
Figure 7:
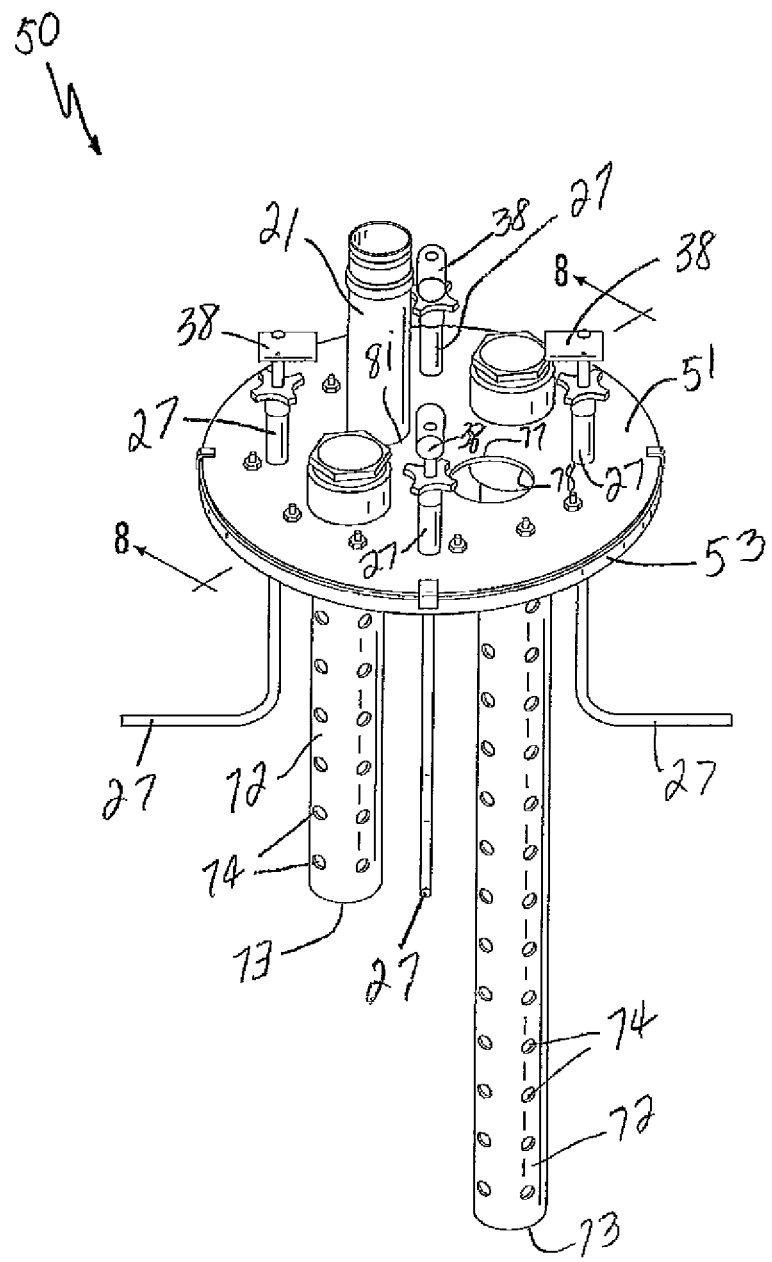
FIG. 7 is an elevated perspective view of an alternative embodiment of a hatch plate in accordance with the present invention.
Figure 11:
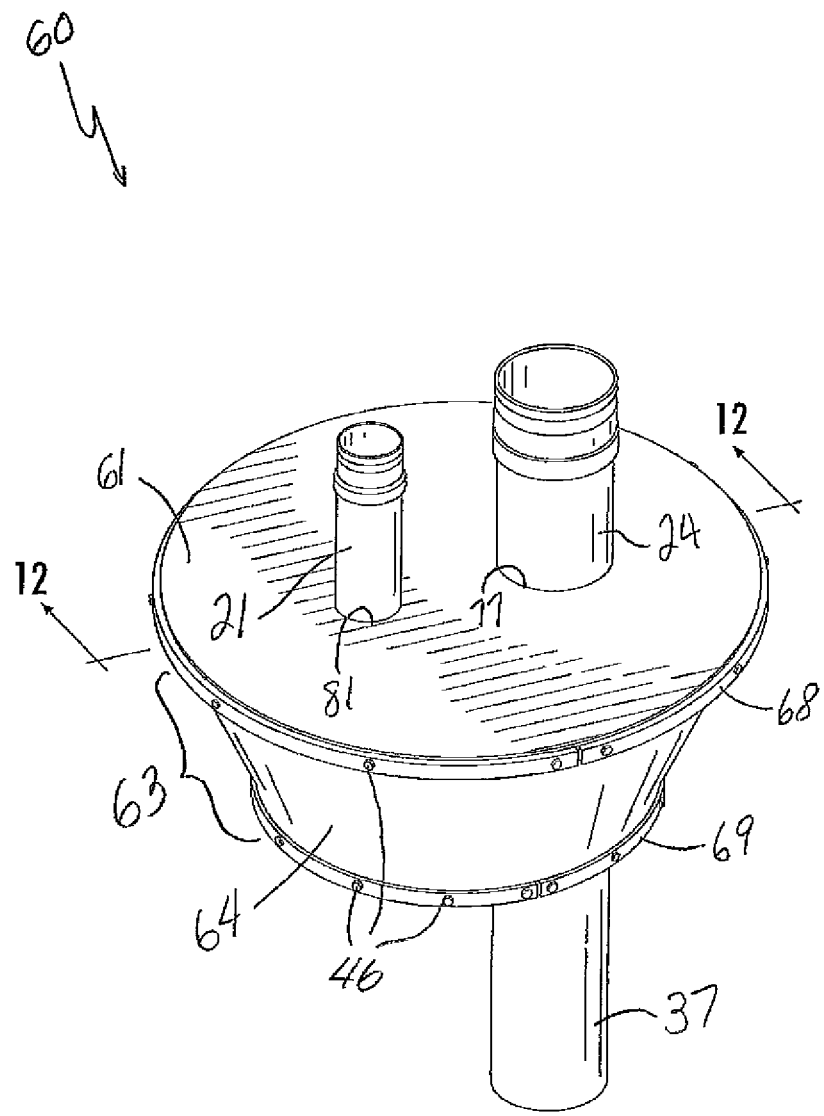
FIG. 11 is an elevated perspective view of another alternative embodiment of a hatch plate in accordance with the present invention.

Different embodiments of a hatch plate 40, 50, 60 are depicted respectively in each of FIGS. 3, 7 and 11 in elevated perspective views for example. Each hatch plate 40, 50, 60 is configured to receive and support an input product pipe 24 that can be connected to the distal end of the discharge pipe 37 of the articulating arm 34. Each hatch plate 40, 50, 60 desirably defines a top member 41, 51, 61, a bottom member 42, 52, 62 and a respective outer edge 43, 53, 63 that connects the respective top member 41, 51, 61 and the respective bottom member 42, 52, 62. The top member 41, 51, 61 of an embodiment of the hatch plate 31 of the present invention desirably has a diameter that is intended to be larger than the diameter of the circular fill opening of the top hatch of the transport tank 32. Each respective outer edge 43, 53, 63 of each respective hatch plate 40, 50, 60 desirably is disposed at the outer periphery of the respective top member 41, 51, 61 and bottom member

42, 52, 62. Additionally, as shown in FIGS. 5A, 5B, 9A and 9B, each respective hatch plate 40, 50 desirably includes a rigid inner spacer element 45 that is a ring 45 disposed between the respective top member 41, 51 and bottom member 42, 52 of the respective hatch plate 40, 50 and radially inwardly from each respective outer edge 43, 53 of each respective hatch plate 40, 50.

Figure 12:
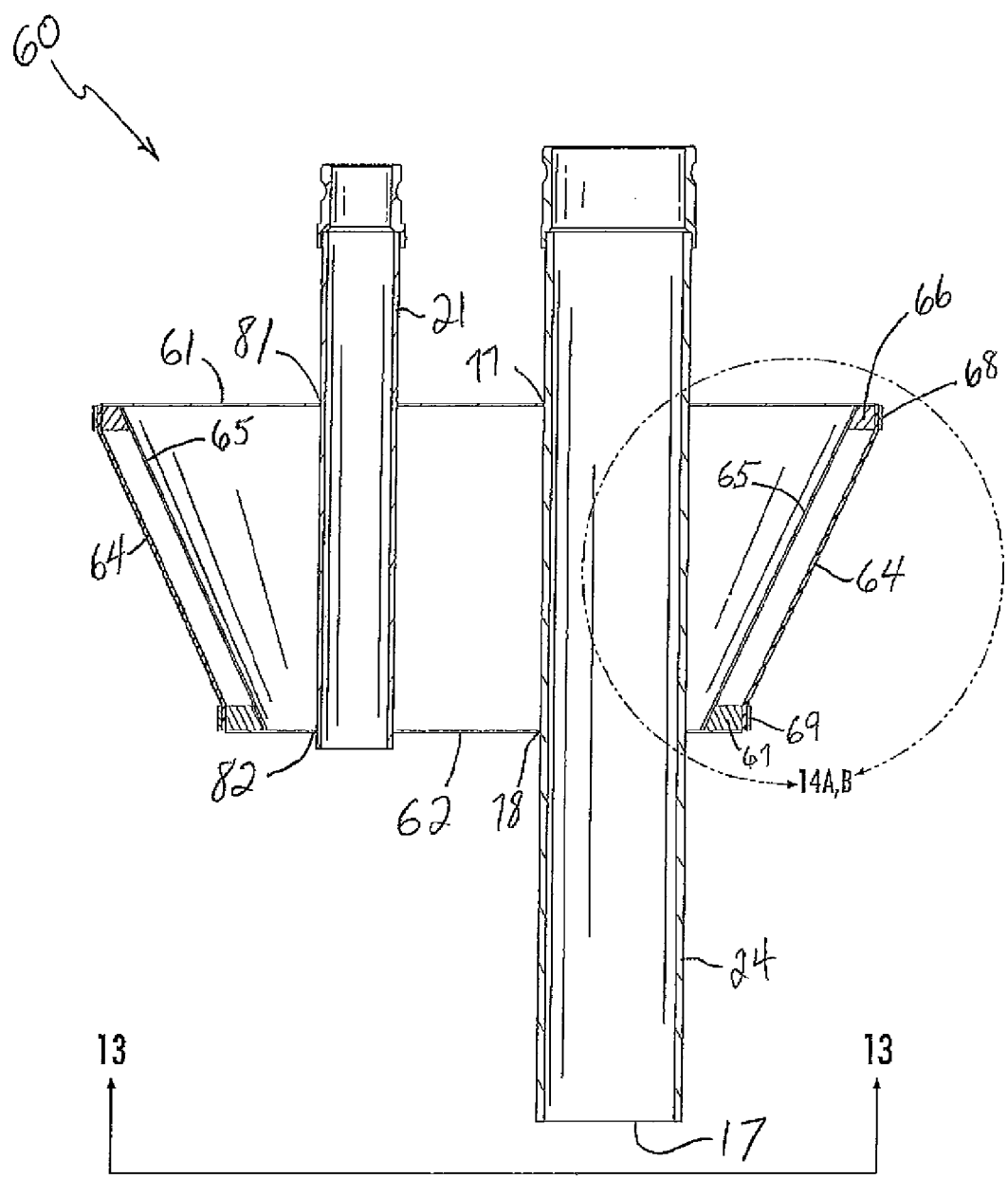
FIG. 12 is a cross-sectional view taken along the lines of 12-12 in FIG. 11.

A typical diameter of at least the top member 41, 51, 61 of a hatch plate 31 of the present invention is about two feet across. The axial distance between the upper surface of the respective top member 41, 51 and the lower surface of the respective bottom member 42, 52 desirably is about one and one quarter inches to about two inches if the diameter of the respective bottom member 42, 52 is about two feet. In one exemplary embodiment with the configuration such as shown in FIG. 12 for example, the axial distance between the upper surface of the top member 61 and the lower surface of the bottom member 62 desirably is about ten inches if the diameter of the top member is two feet and the diameter of the bottom member is about sixteen inches.

In each of the embodiments of the hatch plates, as shown in FIGS. 5A, 5B, 9A, 9B, 14A, 14B, at least one of the bottom member 42, 52, 62 and the outer edge 43, 53, 63 of the hatch plate 40, 50, 60 defines a resiliently flexible section 44, 54, 64 that is configured to deform upon engaging with the top hatch of the transport tank 32, and particularly with the upper surface 29 or the inwardly facing upper edge 39 of the cylindrical wall 28 of the top hatch of the transport tank 32.

Figure 4:
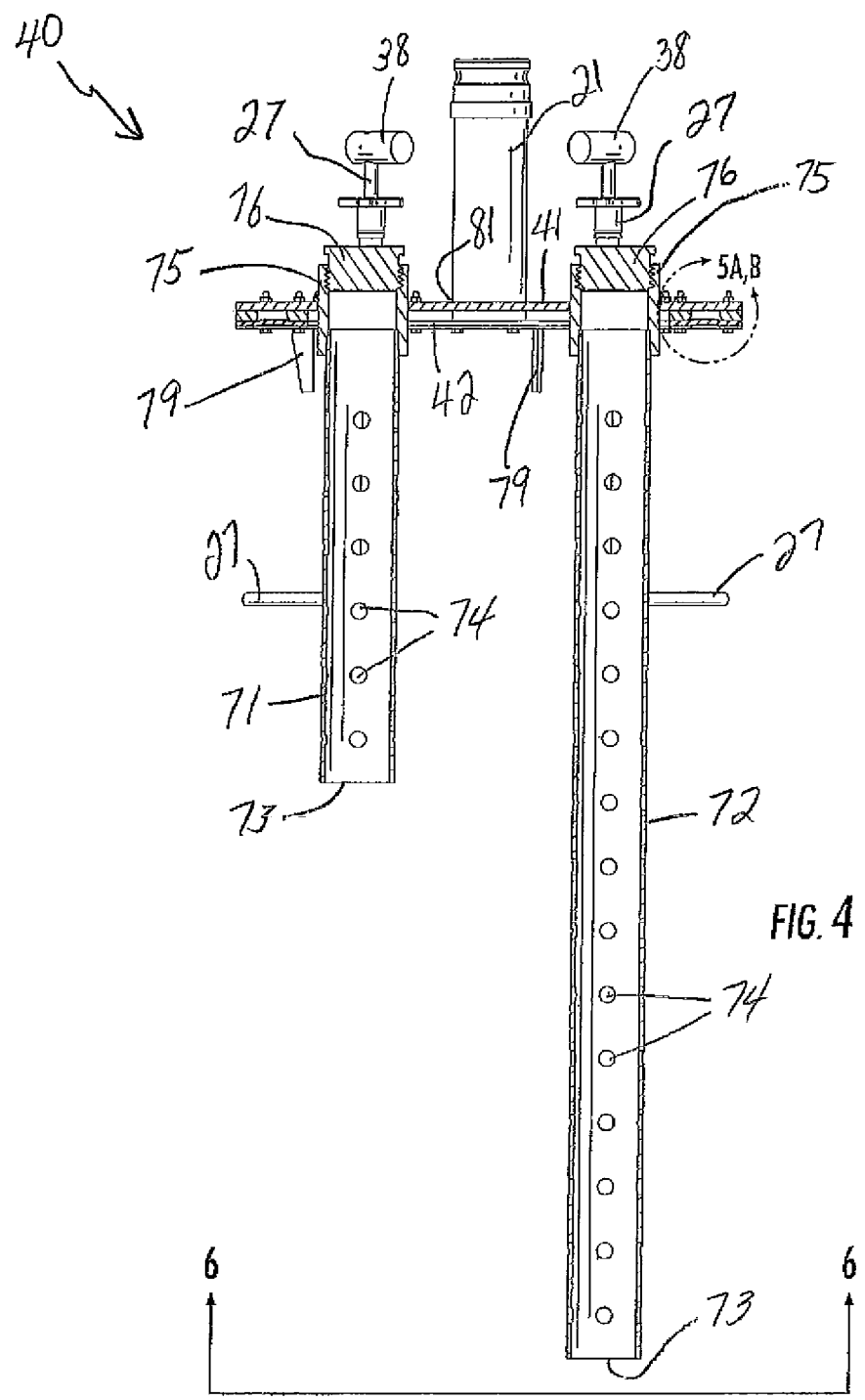
FIG. 4 is a cross-sectional view taken along the lines of 4-4 in FIG. 3.
Figure 5A:
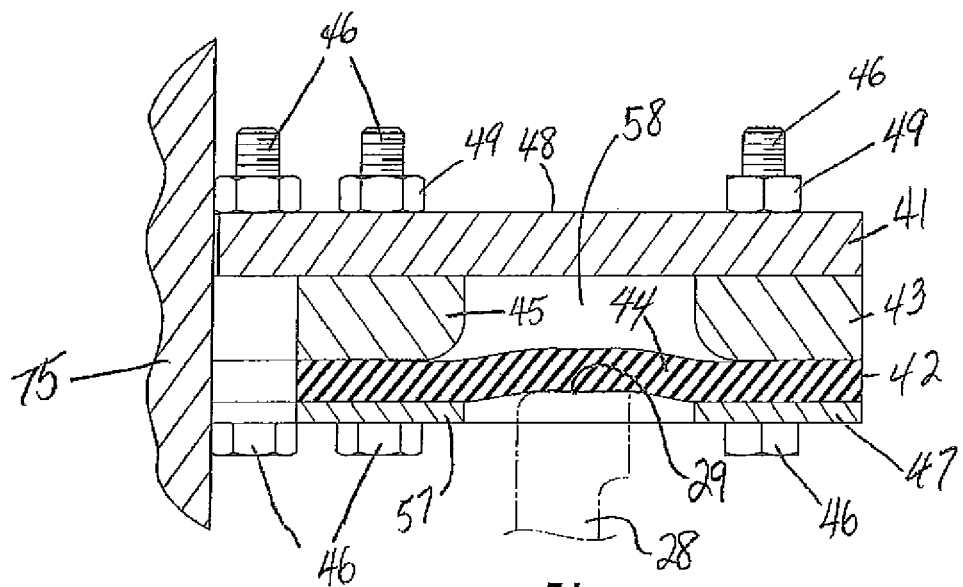
FIG. 5A is an enlarged cross-sectional view of the detail of FIG. 4 with part of the hatch shown in chain dashed line.
Figure 5B:
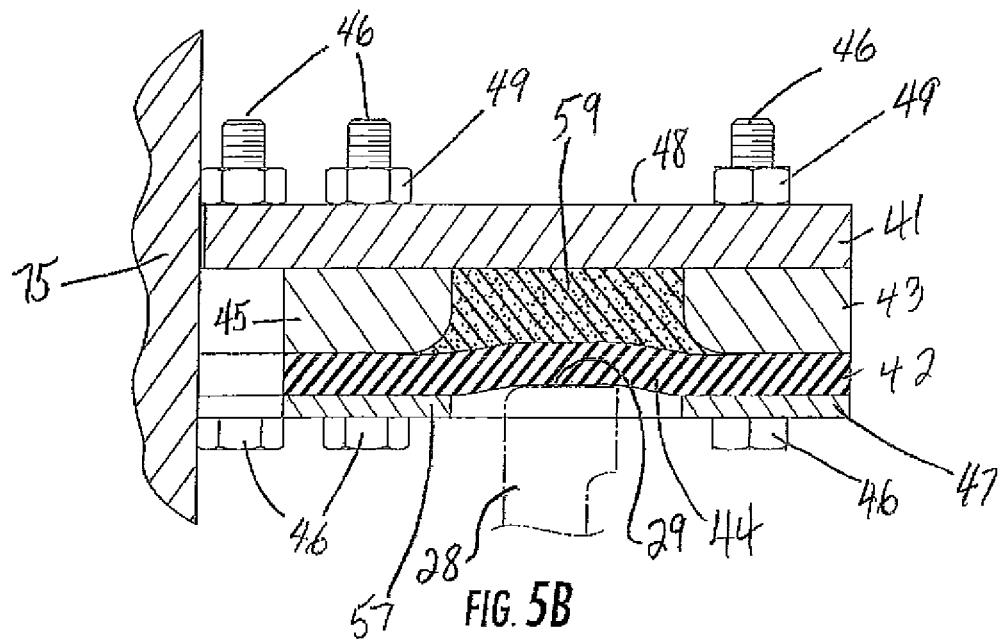
FIG. 5B is an enlarged cross-sectional view of another embodiment similar to the detail of FIG. 4 with part of the hatch shown in chain dashed line.

FIGS. 5A and 5B show a detailed cross-sectional partial view taken from the cross-sectional view depicted in FIG. 4 of the embodiment of the hatch plate 40 shown in FIG. 3. Similarly, FIGS. 9A and 9B show a detailed cross-sectional partial view taken from the cross-sectional view depicted in FIG. 8 of the embodiment of the hatch plate 50 shown in FIG. 7. In each of FIGS. 5A, 5B, 9A and 9B, a cross-section of the wall 28 of the top hatch of the transport tank 32 is depicted in phantom in chain dashed line, and the upper surface of the wall 28 is designated by the numeral 29. The views shown in FIGS. 5A and 5B depict the hatch plate 40 with its bottom member 42 resting against the upper surface 29 of the wall 28 of the top hatch. Similarly, the views shown in FIGS. 9A and 9B depict the hatch plate 50 with its bottom member 52 resting against the upper surface 29 of the wall 28 of the top hatch.

In the embodiments of FIGS. 5A and 5B, the bottom member 42 defines a resiliently flexible section 44 that engages with the top hatch by coming into contact with the upper surface 29 of the wall 28 of the top hatch. As shown schematically in FIGS. 5A and 5B, the so-called hatch contact area of the resiliently flexible section 44 that is available to flex toward the top member 41 when coming into contact with the upper surface 29 of the wall 28 of the top hatch is the central region of the resiliently flexible section 44 that is disposed between the opposed edges of the inner retention ring 57 and the outer retention ring 47 and the opposed edges of the inner spacer ring 45 and the outer edge 43. In one exemplary embodiment of the configuration depicted in FIGS. 5A and 5B, when the diameter of the top member 41 is about 27 inches, the distance between the mutually opposing edges of the inner spacer ring 45 and the outer edge 43 desirably is about three and one-half inches, which is the radial extent of the hatch contact area, and each of the outer edge 43 and the inner spacer ring 45 measures about one and one-half inches in the radial dimension.

Thus, the resiliently flexible section 44 of the bottom member 42 of the hatch plate 40 is defined by an inner perimeter portion and an outer perimeter portion spaced away from the inner perimeter portion by a central portion that is an annular member defining the so-called hatch contact area. As shown in FIGS. 5A and 5B, the rigid inner spacer element 45 is disposed between the top member 41 of the hatch plate 40 and the inner perimeter portion of the resiliently flexible section 44 of the bottom member 42. In this way, the hatch plate 40 is configured to function as a splash guard that reduces the flow of vapors through the open top hatch of the transport tank 32. However, the hatch plate 40 does not provide a seal that eliminates all emissions of vapor from the open top hatch of the transport tank 32 during the process of transferring the bulk material from the storage container 15 into the transport tank 32 via the loading arm 30.

In the embodiments of FIGS. 9A and 9B, the bottom member 52 defines a resiliently flexible section 54 that engages with the top hatch by coming into contact with the upper surface 29 of the wall 28 of the top hatch. As shown schematically in FIGS. 9A and 9B, the so-called hatch contact area of the resiliently flexible section 54 that is available to flex toward the top member 51 when coining into contact with the upper surface 29 of the wall 28 of the top hatch is the outer peripheral region of the resiliently flexible section 54 that is disposed radially outwardly from the outwardly facing edge of the inner retention ring 57 and from the outwardly facing edge of the inner spacer ring 45. In one exemplary embodiment of the configuration depicted in FIGS. 9A and 9B, when the diameter of the top member 51 is about 24 inches, the radial distance between the inner cylindrical surface 56 of outer edge 53 of the hatch plate 50 and the opposing edge of the inner spacer ring 45, which is the radial extent of the hatch contact area, desirably is about three and one-half inches measured in the radial dimension, and the inner spacer ring 45 measures about one and one-half inches in the radial dimension.

Note that because the hatch contact area of the embodiment of the hatch plate 50 of FIGS. 9A and 9B is at the outermost periphery of the bottom member 52, even though the radial extent of the hatch contact area of the hatch plate 40 of FIGS. 5A and 5B is the same as the radial extent of the hatch plate 50 of FIGS. 9A and 9B, the hatch contact area of the embodiment of the hatch plate 50 with the exemplary dimensions given above is greater than the hatch contact area of the embodiment of the hatch plate 40 of FIGS. 5A and 5B with the exemplary dimensions given above. Nonetheless, while the hatch plate 50 functions as a splash guard that reduces the flow of vapors through the open top hatch of the transport tank 32, the hatch plate 50 does not provide a seal that eliminates all emissions of vapor from the open top hatch of the transport tank 32 during the process of transferring the bulk material from the storage container 15 into the transport tank 32 via the loading arm 30.

As shown in FIGS. 5A, 5B, 9A and 9B for example, each respective resiliently flexible section 44, 54 is separated from the respective top member 41, 51 at the innermost region of the respective resiliently flexible section 44, 54 by an inner spacer ring 45 of the respective hatch plate 40, 50. Each inner spacer ring 45 is disposed radially inwardly from the respective outer edge 43, 53 of the respective hatch plate 40, 50. In each of the embodiments of the hatch plate 40, 50, the inner spacer ring 45 cooperates with the inner retention ring 57 to hold in place the innermost region of the respective resiliently flexible section 44, 54. As shown in FIGS. 5A, 5B, 6, 9A, 9B and 10 for example, a series of metal bolts 46 projects through the inner retention ring 57, the inner portion of the respective resiliently flexible section 44, 54 of the respective bottom member 42, 0.52 and the respective top member 41, 51 and is held in place by a respective series of threaded nuts 49. Each threaded nut 49 can be tightened onto the threaded end of the bolt 46 and compress the inner retention ring 57 against the radially inwardly disposed portion of the respective resiliently flexible section 44, 54 of the respective bottom member 42, 52 against the inner spacer ring 45.

As shown in the embodiment of FIGS. 5A and 5B for example, the resiliently flexible section 44 is separated from the top member 41 at the radially outwardly disposed portion of the resiliently flexible section 44 by the outer edge 43 of the hatch plate 40. The outer edge 43 of the hatch plate 40 is disposed radially outwardly from the inner spacer ring 45 and defines a rigid outer spacer element that is disposed between the top member 41 of the hatch plate 40 and the outer perimeter portion of the resiliently flexible section 44 of the bottom member 42. As shown in FIGS. 5A, 5B and 6 for example, a plurality of metal bolts 46 extends through an outer retention ring 47, the radially outwardly disposed portion of the resiliently flexible section 44 of the bottom member 42, the outer edge 43 and the top member 41. Desirably, as shown in FIGS. 5A and 5B, the threaded end of each bolt 46 projects above the top surface 48 of the top member 41 and is threaded to receive a threaded nut 49 that can be tightened onto the threaded end of the bolt 46 and compress the outer retention ring 47 against the outer portion of the resiliently flexible section 44 of the bottom member 42 against the outer edge 43.

In the embodiment of the hatch plate 40 depicted in FIGS. 5A and 5B, the radially outwardly disposed portion of the resiliently flexible section 44 of the bottom member 42 is held fixed with respect to the top member 41. As schematically depicted in each of FIGS. 5A and 5B, the central region of the resiliently flexible section 44 located between the inner spacer ring 45 and the outer edge 43 is free to stretch and deform toward the top member 41 when contacted by the upper surface 29 of the wall 28 of the top hatch of the transport tank 32. This deformation of the resiliently flexible section 44 is sufficient to accommodate most gaps that may develop between the hatch plate 40 and the upper surface 29 of the tank's hatch on account of wear to the hatch or to the hatch plate 40, warping of same due to repeated temperature changes from weather or damage to one or both of them through repeated bumping during the process of aligning the arm's hatch plate 40 over the top hatch of the transport tank 32. Moreover, this deformation of the resiliently flexible section 44 is sufficient to accommodate most gaps that may develop between the hatch plate 40 and the upper surface 29 of the tank's hatch on account of less than ideal alignment between the hatch plate 40 and the plane of the top of the hatch that is caused by the operating limitations of the arm 30, uneven tracks beneath the rail car carrying the transport tank or a sloped grade beneath the truck carrying the transport tank.

As shown in FIGS. 7, 8, 9A and 9B for example, the outer edge 53 of the hatch plate 50 is desirably a rigid cylindrical shell that desirably is permanently connected to the top member 51, as by welding, and extends axially toward the bottom member 52, but is not attached to the bottom member 52. As shown in FIGS. 9A and 9B for example, the outer perimeter portion of the resiliently flexible section 54 terminates in an outer radial edge 55 of the bottom member 52, and this outer radial edge 55 is free to slide against and with respect to the inner cylindrical surface 56 of the outer edge 53 of the hatch plate 50. Thus, in the embodiment of the hatch plate 50 depicted in FIGS. 9A and 9B for example, the outer portion of the resiliently flexible section 44 of the bottom member 42 is not held fixed with respect to the top member 51. As schematically depicted in each of FIGS. 9A and 9B for example, both the central region and the outer region of the resiliently flexible section 54 located between the inner spacer ring 45 and the outer edge 53 are free to stretch and deform toward the top member 51 when contacted by the upper surface 29 of the wall 28 of the top hatch of the transport tank 32. Thus, the hatch contact area of this embodiment of the hatch plate 50 includes both the central region and the outer region of the resiliently flexible section 54 located between the inner spacer ring 45 and the outer edge 53. Therefore, the hatch contact area of this embodiment of the hatch plate 50 forgives a wider range of misalignment between the hatch plate 50 and the top hatch of the transport tank 32. The deformation of the resiliently flexible section 54 is sufficient to accommodate most gaps that may develop between the hatch plate 50 and the upper surface 29 of the tank's hatch on account of wear to the hatch or to the hatch plate 50, warping of same due to repeated temperature changes from weather or damage to one or both of them through repeated bumping during the process of aligning the arm's hatch plate 50 over the top hatch of the transport tank 32. Moreover, this deformation of the resiliently flexible section 54 is sufficient to accommodate most gaps that may develop between the hatch plate 50 and the upper surface 29 of the tank's hatch on account of less than ideal alignment between the hatch plate 50 and the plane of the top of the hatch that is caused by the operating limitations of the arm 30, uneven tracks beneath the rail car carrying the transport tank or a sloped grade beneath the truck carrying the transport tank.

In the respective embodiments of the hatch plates 40, 50, as respectively depicted in FIGS. 5A and 9A, the annular region 58 that is located between the respective top member 41, 51 and bottom member 42, 52 in the axial direction and between the respective outer edge 43, 53 and the inner spacer ring 45 in the radial direction is filled with air. In the respective embodiments of the hatch plates 40, 50, as respectively depicted in FIGS. 5B and 9B, the annular region that is located between the respective top member 41, 51 and bottom member 42, 52 in the axial direction and between the respective outer edge 43, 53 and the inner spacer ring 45 in the radial direction desirably is filled with a resiliently deformable center spacer element 59, which desirably can take the form of an annular ring that desirably is composed of a low density closed cell foam material. The undeformed thickness of the center spacer element 59 of low density closed cell foam material measured in the axial direction between the respective bottom-member 42, 52 and the respective top member 41, 51 is desirably about three eighths of an inch. As shown in FIG. 9B, a resiliently deformable center spacer element 59 is disposed between the top member 51 of the hatch plate 50 and at least the outer portion of the resiliently flexible section 54 of the bottom member 52.

Each of the outer edge 43 and the inner spacer ring 45 desirably can be formed as a continuous ring or as a ring that is made from partial ring segments, as desired and desirably can be formed of aluminum for example. Each of the respective top member 41, 51, the outer retention ring 47, the outer edge 53 and the inner retention ring 57 desirably is formed of steel plate or tube with the thickness of the respective top member 41, 51 desirably at least twice the thickness of each of the outer retention ring 47, the outer edge 53 and the inner retention ring 57. The bolts 46 and nuts 49 likewise desirably are formed of steel.

Figure 8:
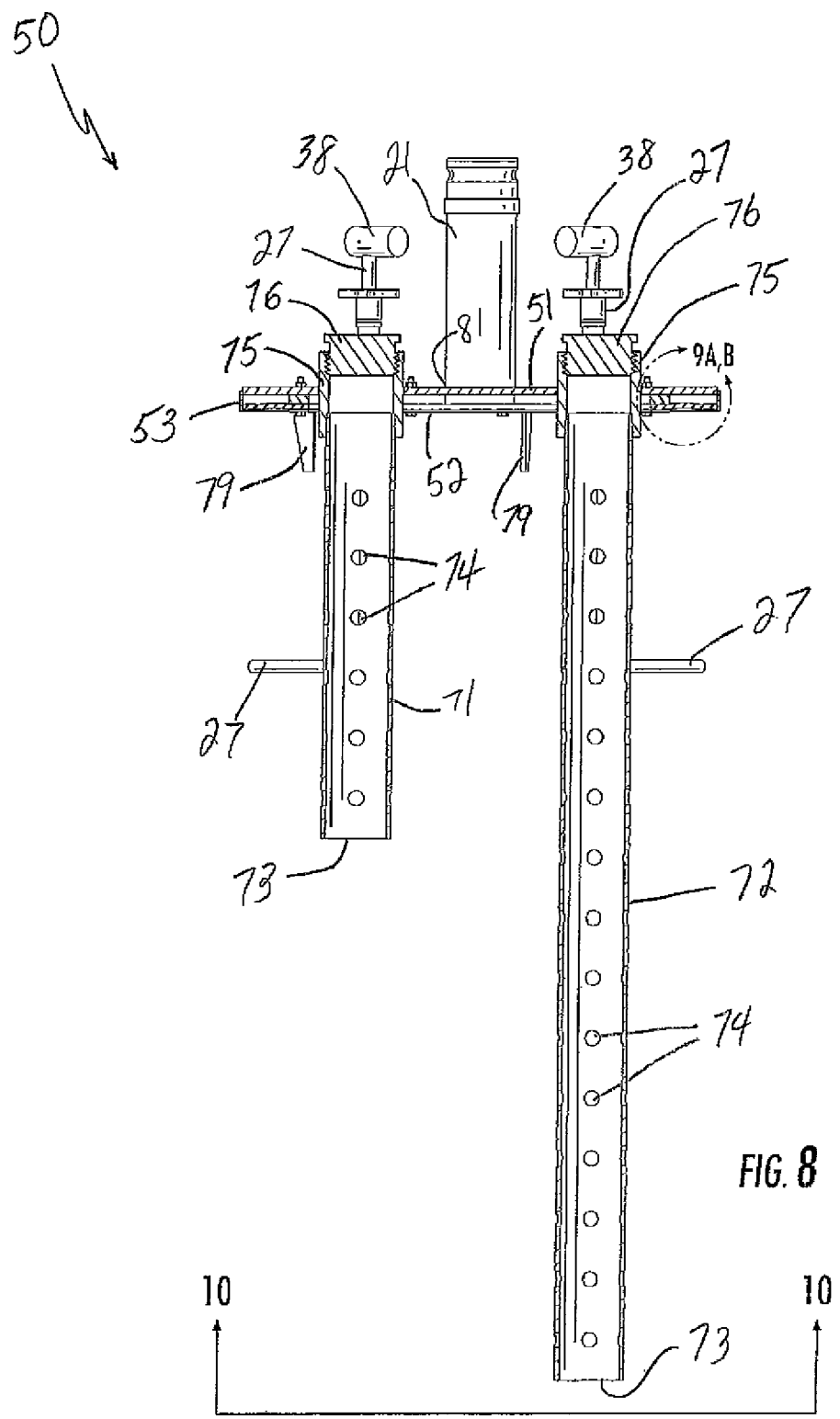
FIG. 8 is a cross-sectional view taken along the lines of 8-8 in FIG. 7.
Figure 9A:
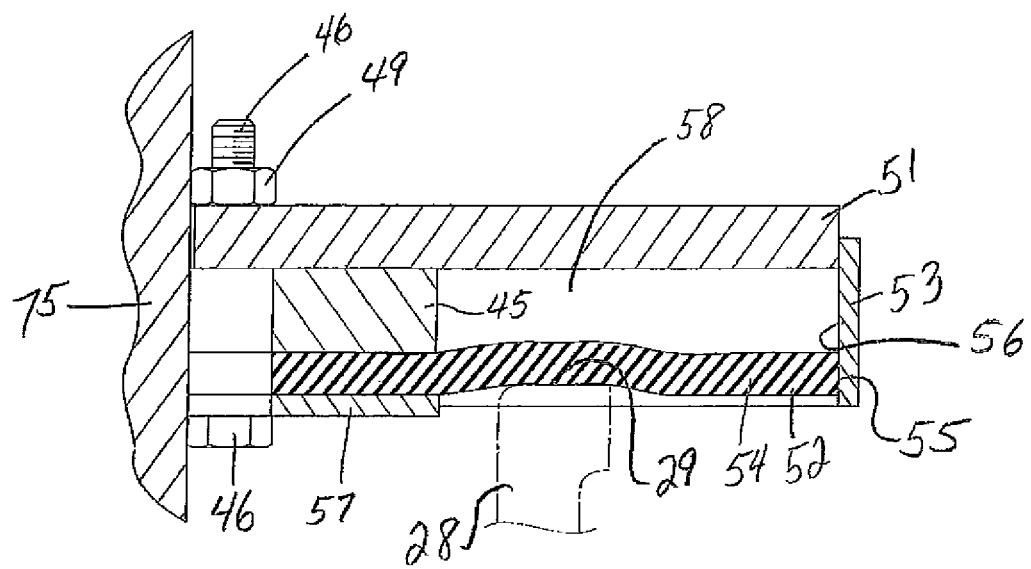
FIG. 9A is an enlarged cross-sectional view of the detail of FIG. 8 with part of the hatch shown in chain dashed line.
Figure 9B:
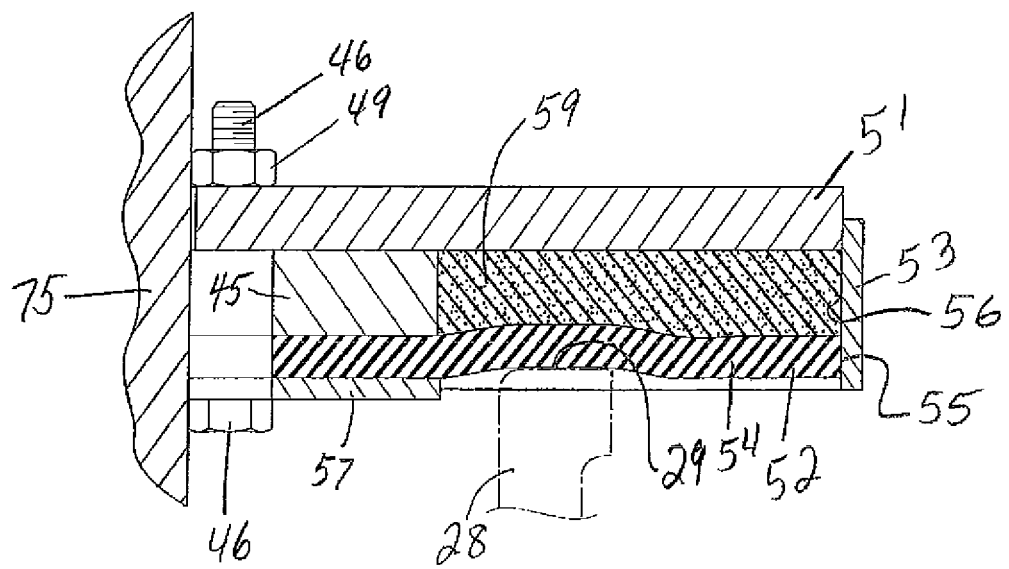
FIG. 9B is an enlarged cross-sectional view of another embodiment similar to the detail of FIG. 8 with part of the hatch shown in chain dashed line.

In each of the embodiments of the respective hatch plate 40, 50 depicted in cross-section in FIGS. 4 and 8 for example, a pair of sensor tubes 71, 72 extends beneath the respective bottom member 42, 52. One of the sensor tubes 72 is about twice the length of the other sensor tube 71, and each of the sensor tubes 71, 72 is hollow and open at the distal end 73 that is farthest away from the respective bottom member 42, 52. Each sensor tube 71, 72 is configured to hold one or more probes or sensors that monitor conditions inside the transport tank 32 and provide data about such conditions to the operators of the loading aim 30. Moreover, each of the sensor tubes 71, 72 has a plurality of holes 74 along the length of the sensor tube 71, 72. These holes further expose the interior of the sensor tube 71, 72 to the bulk material and conditions inside the transport tank 32.

The proximal end of each sensor tube 71, 72 disposed closest to the respective bottom member 42, 52 is connected to a fixture 75 that extends through aligned openings formed through each of the respective top member 41, 51 and respective bottom member 42, 52. The portions of each fixture 75 extending above the respective top member 41, 51 of the respective hatch plate 40, 50 is provided with a threaded inner surface that mates with a threaded plug 76 that can be screwed into the fixture 75 to close off the fixture 75 and thus the proximal end of each sensor tube 71, 72.

Figure 10:
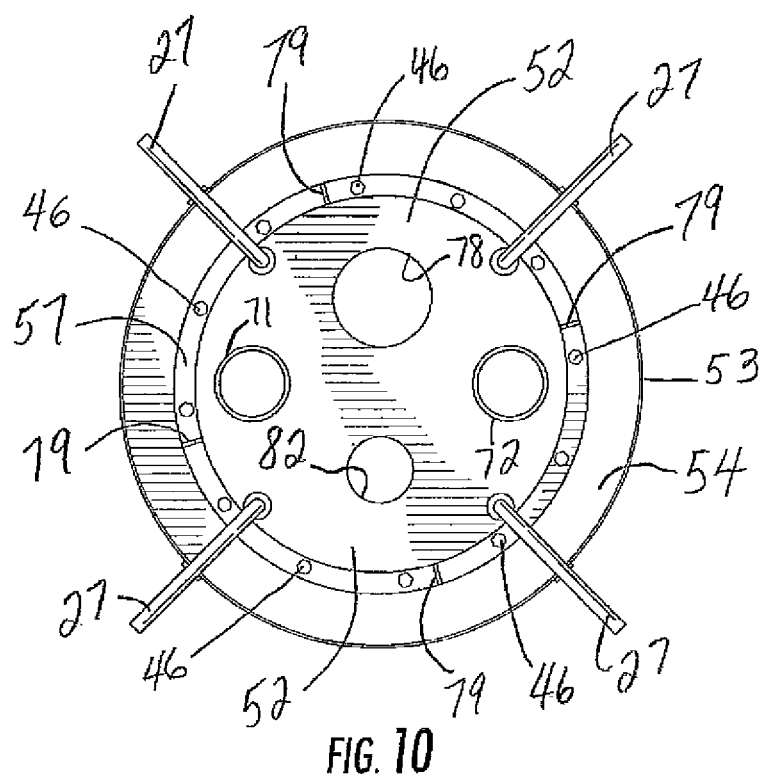
FIG. 10 is a bottom plan view taken from the direction of the arrows 6-6 in FIG. 8.

In each respective embodiment of the hatch plate 40, 50, as shown in FIGS. 4, 6, 8 and 10 for example, a plurality of alignment tabs 79 is provided. Each alignment tab 79 projects axially from the inner-retention ring 57 and is configured to facilitate centering the respective hatch plate 40, 50 with respect to the opening in the top hatch of the transport tank 32. As shown in FIGS. 6 and 10 for example, four alignment tabs 79 desirably are equally spaced circumferentially around the inner retention ring 57. In each respective embodiment of the hatch plate 40, 50, as shown in FIGS. 3, 4, 7 and 8 for example, each of the so-called "J" hooks 27 is provided with a handle 38 by which the user can manually tighten down the respective hatch plate 40, 50 onto the upper surface 29 of the wall 28 of the top hatch of the transport tank 32.

Figure 14:
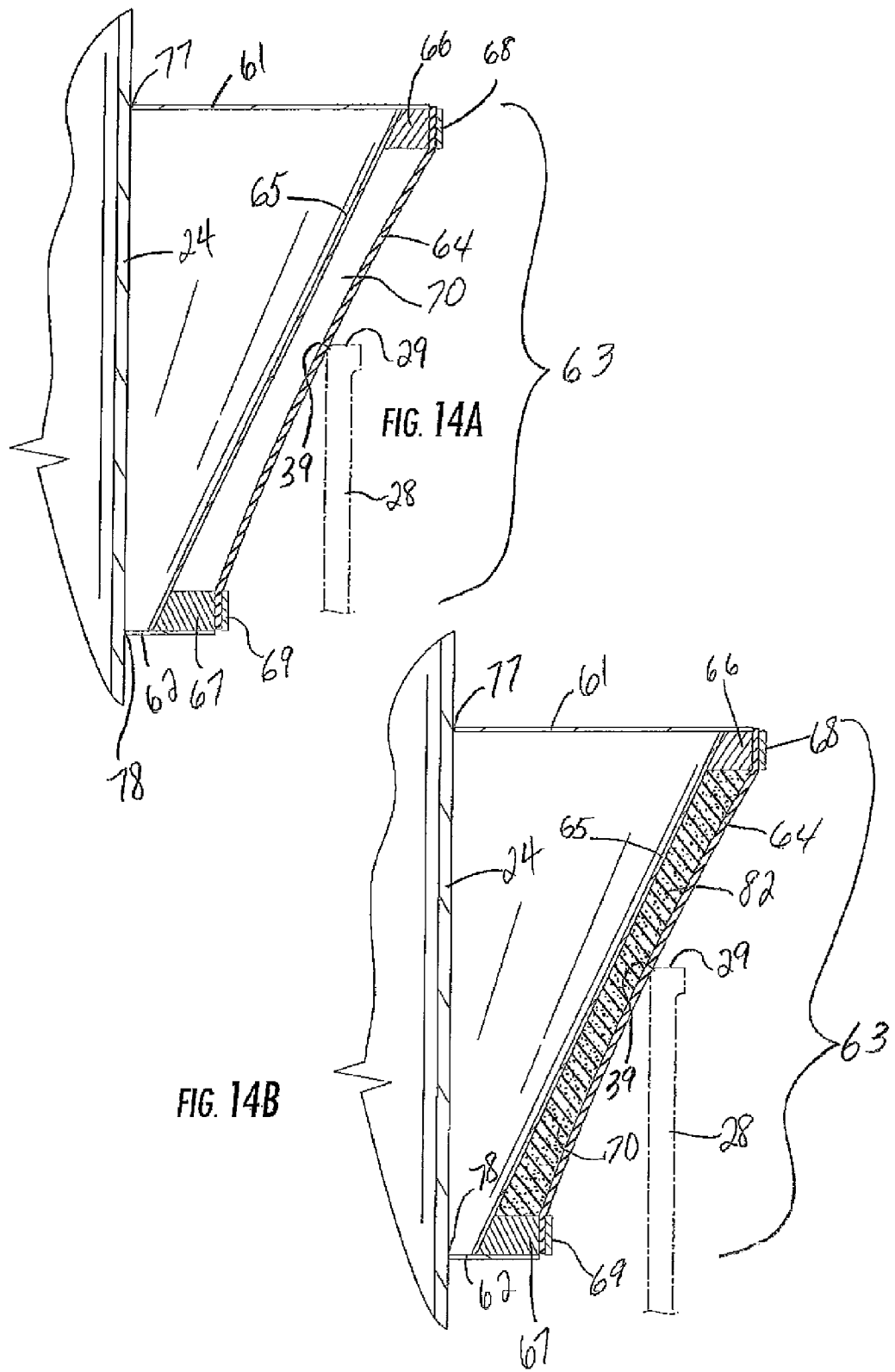
FIG. 14A is an enlarged cross-sectional view of a portion of FIG. 12 with part of the hatch shown in chain dashed line.
FIG. 14B is an enlarged cross-sectional view of another embodiment similar to FIG. 12 with part of the hatch shown in chain dashed line.

In an alternative embodiment of the hatch plate 60 shown in FIGS. 11 and 12 for example, there is no need for the alignment tabs of the hatch plate embodiments 40, 50 of FIGS. 3 and 7 for example. In embodiment of the hatch plate 60 shown in FIGS. 11 and 12, the outer edge 63 of the hatch plate 60 defines a conical outer shell, and the area of the surface of the bottom member 62 is less than the area of the surface of the top member 61 of the hatch plate 60. As schematically shown in FIGS. 14A and 14B, this conical outer shell of the outer edge 63 of the hatch plate 60 defines the resiliently flexible section 64 that is configured to deform upon engaging with the inwardly facing upper edge 39 of the wall 28 of the top hatch of the transport tank 32. Thus, in the embodiment of the hatch plate 60 of FIG. 11, the resiliently flexible section 64 of the outer edge 63 desirably takes the form of a truncated cone. As shown in FIGS. 12, 14A and 14B, the hatch plate 60 also includes a conical inner shell 65 disposed inside the conical outer shell formed by the resiliently flexible section 64 of the outer edge 63.

Figure 13:
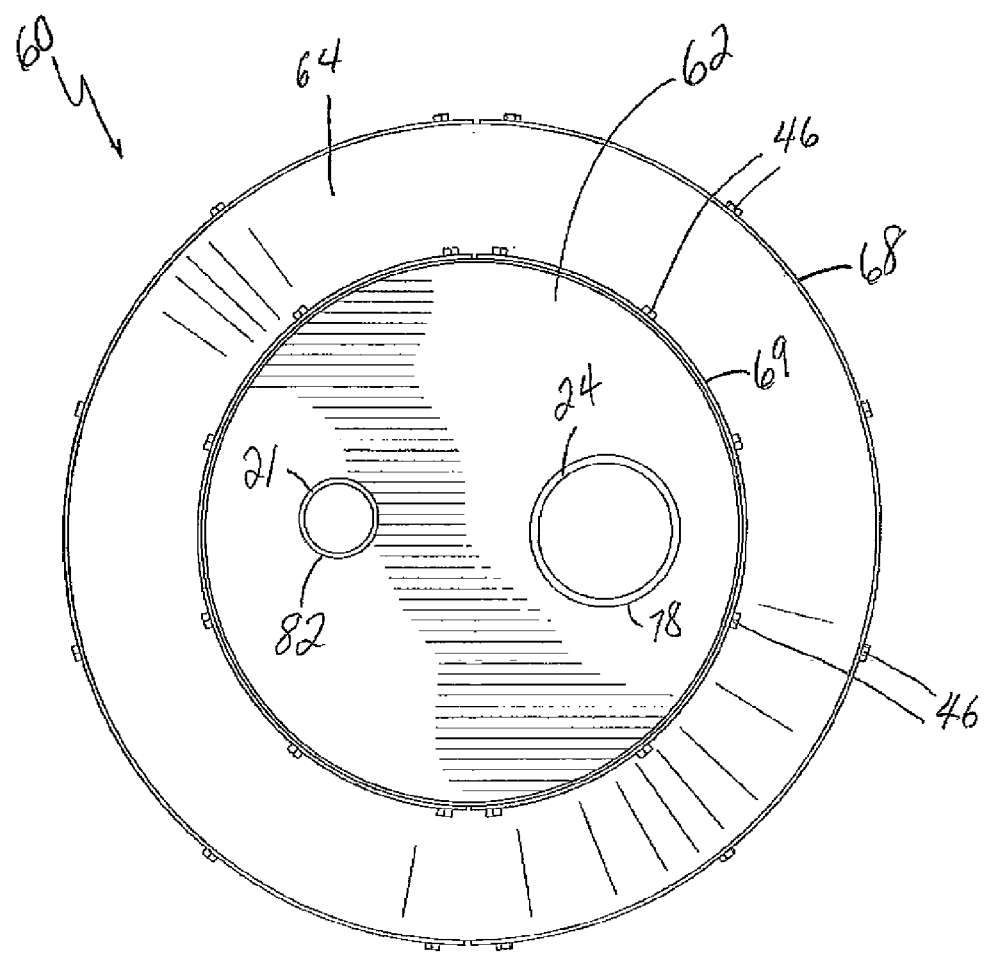
FIG. 13 is a bottom plan view taken from the direction of the arrows 13-13 in FIG. 12.

As shown in FIGS. 14A and 14B, the hatch plate 60 further includes an upper spacer element 66 and a lower spacer element 67. The upper spacer element 66 desirably is disposed underneath and against the radially outermost region of the top member 61 to support same and radially between the resiliently flexible section 64 and the conical inner shell 65. The lower spacer element 67 desirably is disposed underneath and against the radially outermost region of the bottom member 62 to support same and radially between the resiliently flexible section 64 and the conical inner shell 65. The outer edge 63 of the hatch plate 60 further includes an upper rim 68, and the upper peripheral section of the resiliently flexible section 64 of the outer edge 63 of the hatch plate 60 is held fast between the inner surface of the upper rim 68 and the outer surface of the upper spacer element 66. Similarly, the outer edge 63 of the hatch plate 60 further includes a lower rim 69, and the lower peripheral section of the resiliently flexible section 64 of the outer edge 63 of the hatch plate 60 is held fast between the inner surface of the lower rim 69 and the outer surface of the lower spacer element 67. As shown in FIGS. 11 and 13 for example, a plurality of threaded bolts 46 that are screwed into the respective upper spacer element 66 and lower spacer element 67 holds the respective upper rim 68 and lower rim 69 against the respective peripheral section of the resiliently flexible section 64 of the outer edge 63 of the hatch plate 60.

Each of the upper spacer element 66 and the lower spacer element 67 desirably can be formed as a continuous ring or as a ring that is made from partial ring segments, as desired and desirably can be formed of aluminum for example. Each of the conical inner shell 65 and top member 61 desirably is formed of steel plate. Each of the upper rim 68 and lower rim 69 desirably is formed of tubular steel. Each of the upper rim 68 and the lower rim 69 desirably can be formed as a continuous ring or as a ring that is made from partial ring segments, as desired. Similarly, the conical inner shell 65 desirably can be formed as a continuous truncated cone or as a truncated cone that is made from partial conical segments, as desired.

In the embodiment of the hatch plate 60 partially depicted in FIG. 14A, the conical region 70 that is located between the upper spacer element 66 and the lower spacer element 67 in the axial direction and between the conical inner shell 65 and the resiliently flexible section 64 of the outer edge 63 in the radial direction is filled with air. In the embodiment of the hatch plate 60 partially depicted in FIG. 14B, the conical region 70 that is located between the upper spacer element 66 and the lower spacer element 67 in the axial direction and between the conical inner shell 65 and the resiliently flexible section 64 of the outer edge 63 in the radial direction desirably is filled with a resiliently deformable center spacer element 59, which desirably can take the form of a truncated cone that desirably is composed of a low density closed cell foam material. The thickness of the center spacer element 59 of low density closed cell foam material measured between the conical inner shell 65 and the resiliently flexible section 64 of the outer edge 63 is desirably about three eighths of an inch. As shown in FIG. 14B, a resiliently deformable center spacer element 59 is disposed between the upper spacer element 66 and the lower spacer element 67.

In the embodiment of the hatch plate 60 depicted in FIGS. 14A and 14B, the outer portions of the resiliently flexible section 64 of the outer edge 63 are held fixed with respect to the top member 61 and the bottom member 62. As schematically depicted in each of FIGS. 14A and 14B, the central region of the resiliently flexible section 44 located between the upper spacer element 66 and the lower spacer element 67 is free to stretch and deform toward the conical inner shell 65 when contacted by the inwardly facing upper edge 39 of the wall 28 of the top hatch of the transport tank 32. This deformation of the resiliently flexible section 64 is sufficient to accommodate most gaps that may develop between the hatch plate 60 and the inwardly facing upper edge 39 of the wall 28 of the tank's top hatch on account of wear to the top hatch or to the hatch plate 60, warping of same due to repeated temperature changes from weather or damage to one or both of them through repeated bumping during the process of aligning the loading arm's hatch plate 60 over the top hatch of the transport tank 32. Moreover, this deformation of the resiliently flexible section 64 is sufficient to accommodate most gaps that may develop between the hatch plate 40 and the inwardly facing upper edge 39 of the wall 28 of the tank's top hatch on account of less than ideal alignment between the hatch plate 60 and the plane of the top of the hatch that is caused by the operating limitations of the arm 30, uneven tracks beneath the rail car carrying the transport tank or a sloped grade beneath the truck carrying the transport tank. In this way, the hatch plate 60 functions as a splash guard that reduces the flow of vapors through the open top hatch of the transport tank 32. However, the hatch plate 60 does not provide a vapor-tight seal that eliminates all emissions of vapor from the open top hatch of the transport tank 32 during the process of transferring the bulk material from the storage container 15 into the transport tank 32 via the loading aim 30.

The respective resiliently flexible section 44, 54, 64 desirably is formed of an elastomer that is on the order of one eighth to one quarter inches thick depending on the material and its hardness, which desirably are determined depending on the dimensions of the hatch opening and the nature of the bulk material that is being carried by the transport tank 32. Moreover, in order to accommodate these different conditions (especially the characteristics of the bulk material that is being carried by the transport tank 32) likely to be encountered by the loading arm 30 of the present invention, elastomers of different thicknesses, hardnesses, compositions, pliabilities, flexibilities, etc. can be changed out in each hatch plate 40, 50, 60 by undoing the bolts 46 that secure the elastomers in place.

In each respective embodiment of the hatch plate 40, 50, 60, as shown in FIGS. 3, 4, 6, 7, 8, 10, 11, 12 and 13 for example, a vapor pipe 21 extends through respective aligned openings 81, 82 formed in each of the respective top member 41, 51, 61 and respective bottom member 42, 52, 62 so that the distal end of the vapor pipe 21 is exposed to the interior of the transport tank 32 when the respective hatch plate 40, 50, 60 is resting on the upper surface 29 or inwardly facing upper edge 39 of the wall 28 of the top hatch of the transport tank 32. In each respective embodiment of the hatch plate 40, 50, 60 as shown in FIGS. 3, 6, 7, 10, 11, 12 and 13 for example, an aligned opening 77, 78 respectively is formed through each of the respective top member 41, 51, 61 and respective bottom member 42, 52, 62 for receiving therethrough the input product tube 24 that can be connected to the distal end of the discharge pipe 37 (shown in FIG. 2 for example) of the articulating arm 34.

Figure 15:
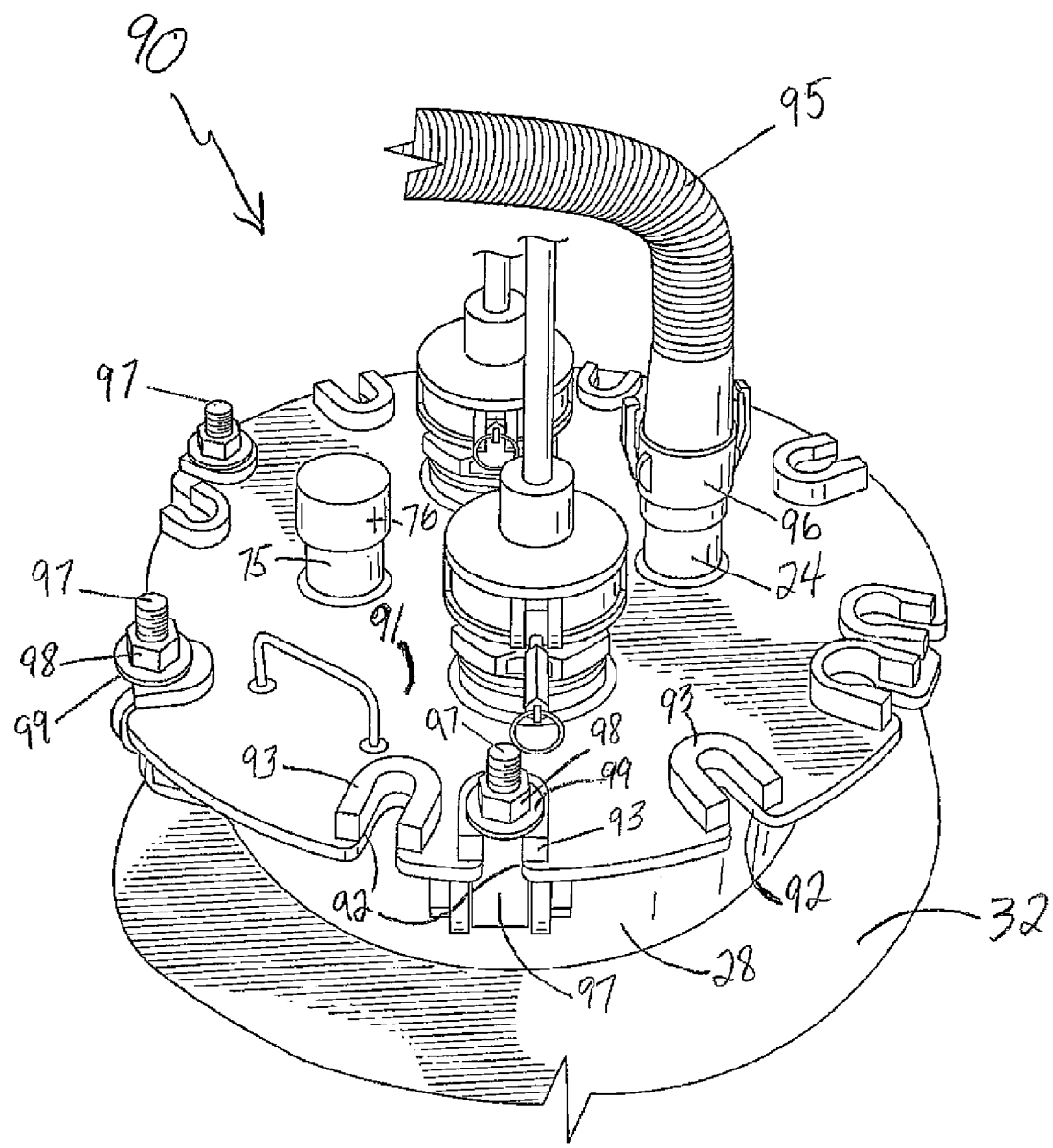
FIG. 15 is an elevated perspective view of another alternative embodiment of a hatch plate in accordance with the present invention.

FIG. 15 presents an elevated perspective view of an alternative embodiment of a top member 91 of a hatch plate (indicated generally by the numeral 90), and this alternative embodiment of the top member 91 can be substituted for any of the respective top members 41, 51, 61 of the respective different embodiments of a hatch plate 40, 50, 60 depicted respectively in each of FIGS. 3, 7 and 11 for example. The top member 91 in FIG. 15 illustrates two features, and one or both of these features can be substituted for the comparable features disclosed above in the hatch plates 40, 50, 60 depicted respectively in each of FIGS. 3, 7 and 11. One feature relates to the means of carrying the flowing material in bulk from a storage container 15 (FIG. 1) into a transport tank 32 (FIG. 2), and the other feature relates to the means of securing the hatch plate 90 to the hatch.

The hatch plates 40, 50, 60, 90 of the present invention can be used with a flexible delivery hose 95 in lieu of a loading aim 30 as the means of carrying the flowing material in bulk from a storage container 15 (FIG. 1) into a transport tank 32 (FIG. 2). In the partial view of FIG. 15, the lower portion of the vertically extending cylindrical sidewall 28 of the hatch of a transport tank 32 is visible along with the top member 91 of an alternative embodiment of the hatch plate 90. As schematically shown in FIG. 15, the top member 91 of the hatch plate 90 can be attached to the distal end of the hose 95 securely or with a quick disconnect union 96 between the input product pipe 24 the distal end of the hose 95.

In lieu of a plurality of "J" hooks 27 (FIGS. 3 and 7 for example), the means of securing the hatch plate 40, 50, 60, 90 to the hatch can include a plurality of pivotable bolts. As schematically shown in FIG. 15, the top member 91 of the hatch plate 90 can be held in place with respect to the sidewall 28 of the hatch by a plurality of bolts 97. As schematically shown in FIG. 15, one end of each bolt 97 is pivotally connected to the hatch, and the exterior of the opposite end of each bolt 97 is threaded to receive an internally threaded nut 98 and washer 99. The mid-section of each bolt 97 is received in one of a plurality of radially directed slots 92 that is formed in the outer periphery of the top member 91. The periphery of the top member 91 in which the slots 92 are defined is disposed radially outwardly from the outer edge 43, 53 (FIGS. 5A, 9A respectively for example) or the upper rim 68 (FIG. 13 for example) of the respective hatch plates 40, 50, 60 discussed above. A reinforcement collar 93 is fixed to the top member 91 and is shaped and disposed so as to align with one of the slots 92 formed in the top member 91. As schematically shown in FIG. 15, one of the washers 99 desirably rests on one of the collars 93, and one of the nuts 98 desirably rests against the washer 99 when the top member 91 is connected to the sidewall 28 of the hatch of the transport tank 32. There desirably are enough slots 92 in the top member 91 and enough pivotable bolts 97 around the opening of the hatch so that when the hatch plate 90 is positioned in the opening of the hatch, enough of the bolts 97 can be pivoted into a respective slot 92 and associated collar 93 and secured by the nuts 98 and washers 99 so as to hold the hatch plate 90 in place during the procedure of filling the transport tank 32. However, the dependence on such somewhat fortuitous alignments of bolts 97 and slots 92 is eliminated by using "J" hooks 27 as the means of securing the hatch plate 40, 50, 60, 90 to the hatch.

While at least one presently preferred embodiment of the invention has been described using specific terms, such description is for illustrative purposes only, and it is to be understood that changes and variations may be made without departing from the spirit or scope of the following claims. This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A loading arm that transfers flowing bulk material from a storage vessel and into a container through a top hatch of the transport tank that is carried on a truck or rail car for transport, comprising:
   a. an articulating arm including a plurality of connected hollow pipes, at least two of the hollow pipes connected pivotally together;
   b. a hatch plate connected to the arm and defining a top member, a bottom member, a continuous retention ring and an outer edge connecting the top and bottom members;
   c. one of the hollow pipes of the articulating arm defining a discharge pipe defining at one end thereof an outlet opening configured to permit the flowing bulk material to be discharged from the articulating arm, the outlet opening being disposed on the side of the bottom member that faces away from the top member; and
   d. wherein at least the bottom member of the hatch plate defines a resiliently flexible section configured to deform upon engaging with the top hatch of the transport tank and the resiliently flexible section of the bottom member of the hatch plate is defined by an annular member having an inner perimeter portion and an outer perimeter portion spaced away from the inner perimeter portion by a central portion and wherein the hatch plate includes a rigid inner spacer element that is disposed between the top member of the hatch plate and the inner perimeter portion of the resiliently flexible section of the bottom member, the inner perimeter portion of the resiliently flexible section of the bottom member being held between the retention ring and the rigid inner spacer element.

2. The loading arm of claim 1, wherein the outer edge forms a rigid outer spacer element that is disposed between the top member of the hatch plate and the outer perimeter portion of the resiliently flexible section of the bottom member.

3. The loading arm of claim 2, wherein the hatch plate further includes a resiliently deformable center spacer element that is disposed between the top member of the hatch plate and the central portion of the resiliently flexible section of the bottom member.

4. The loading arm of claim 1, wherein the outer edge of the hatch plate defines a cylindrical surface.

5. The loading arm of claim 4, wherein the outer edge of the hatch plate defines a rigid cylindrical shell.

6. The loading arm of claim 5, wherein the hatch plate further includes a resiliently deformable center spacer element that is disposed between the top member of the hatch plate and at least the central portion of the resiliently flexible section of the bottom member.

7. The loading arm of claim 5, wherein the hatch plate further includes a resiliently deformable center spacer element that is disposed between the top member of the hatch plate and at least the outer portion of the resiliently flexible section of the bottom member.

8. The loading arm of claim 5, wherein the rigid cylindrical shell of the outer edge of the hatch plate defines an inner surface and the outer perimeter portion of the resiliently flexible section of the bottom member is free to slide relative to the inner surface of the outer edge of the hatch plate both toward and away from the top member of the hatch plate.

9. The loading arm of claim 8, wherein the hatch plate further includes a resiliently deformable center spacer element that is disposed between the top member of the hatch plate and at least the central portion of the resiliently flexible section of the bottom member.

10. The loading arm of claim 8, wherein the hatch plate further includes a resiliently deformable center spacer element that is disposed between the top member of the hatch plate and at least the outer portion of the resiliently flexible section of the bottom member.

11. A hatch plate for disposition at the discharge end of a loading arm or flexible delivery hose that transfers flowing bulk material from a storage vessel and into a transport tank through a top hatch of the transport tank that is carried on a truck or rail car for transport, the hatch plate comprising:
   a. a top member, a bottom member, a continuous retention ring and an outer edge connecting the top and bottom members; and
   b. wherein at least the bottom member of the hatch plate defines a resiliently flexible section configured to deform upon engaging with the top hatch of the transport tank and the resiliently flexible section of the bottom member of the hatch plate is defined by an annular member having an inner perimeter portion and an outer perimeter portion spaced away from the inner perimeter portion by a central portion and wherein the hatch plate includes a separately formed rigid inner spacer element that is disposed between the top member of the hatch plate and the inner perimeter portion of the resiliently flexible section of the bottom member, the inner perimeter portion of the resiliently flexible section of the bottom member being held between the retention ring and the rigid inner spacer element.

12. The hatch plate of claim 11, wherein the outer edge forms a rigid outer spacer element that is disposed between the top member of the hatch plate and the outer perimeter portion of the resiliently flexible section of the bottom member.

13. The hatch plate of claim 12, wherein the hatch plate further includes a resiliently deformable center spacer element that is disposed between the top member of the hatch plate and the central portion of the resiliently flexible section of the bottom member.

14. The hatch plate of claim 11, wherein the outer edge of the hatch plate defines a cylindrical surface.

15. The hatch plate of claim 14, wherein the outer edge of the hatch plate defines a rigid cylindrical shell.

16. The hatch plate of claim 15, wherein the rigid cylindrical shell of the outer edge of the hatch plate defines an inner surface and the outer perimeter portion of the resiliently flexible section of the bottom member is free to slide relative to the inner surface of the outer edge of the hatch plate both toward and away from the top member of the hatch plate.

17. The hatch plate of claim 16, wherein the hatch plate further includes a resiliently deformable center spacer element that is disposed between the top member of the hatch plate and at least the central portion of the resiliently flexible section of the bottom member.

18. The hatch plate of claim 16, wherein the hatch plate further includes a resiliently deformable center spacer element that is disposed between the top member of the hatch plate and at least the outer portion of the resiliently flexible section of the bottom member.

19. A hatch plate for disposition at the discharge end of a loading arm or flexible delivery hose that transfers flowing bulk material from a storage vessel and into a transport tank through a top hatch of the transport tank that is carried on a truck or rail car for transport, the hatch plate comprising:

a. a top member, a bottom member, a retention ring and an outer edge connecting the top and bottom members; and b. wherein at least the bottom member of the hatch plate defines a resiliently flexible section configured to deform upon engaging with the top hatch of the transport tank and the resiliently flexible section of the bottom member of the hatch plate is defined by an annular member having an inner perimeter portion and an outer perimeter portion spaced away from the inner perimeter portion by a central portion and wherein the hatch plate includes a rigid inner spacer element that is disposed between the top member of the hatch plate and the inner perimeter portion of the resiliently flexible section of the bottom member, the inner perimeter portion of the resiliently flexible section of the bottom member being held between the retention ring and the rigid inner spacer element; and wherein the hatch plate further includes a resiliently deformable center spacer element that is disposed between the top member of the hatch plate and at least the central portion of the resiliently flexible section of the bottom member.

20. The hatch plate of claim 19, wherein the resiliently deformable center spacer element is disposed between the top member of the hatch plate and at least the outer portion of the resiliently flexible section of the bottom member.

21. A delivery hose that transfers flowing bulk material from a storage vessel and into a container through a top hatch of the transport tank that is carried on a truck or rail car for transport, comprising:

a. a flexible hose defining a proximal end and a distal end opposite the proximal end, the proximal end being connectable in communication with the storage vessel;

b. a hatch plate connected to the distal end of the flexible hose and defining a top member, a bottom member spaced apart from the top member in an axial direction, a continuous retention ring and an outer edge connecting the top and bottom members;

c. a discharge pipe defining at one end thereof an outlet opening configured to permit the flowing bulk material to be discharged from the distal end of the flexible hose, the outlet opening being disposed on the side of the bottom member that faces away from the top member in the axial direction; and d. wherein at least the bottom member of the hatch plate defines a resiliently flexible section configured to deform upon engaging with the top hatch of the transport tank and the resiliently flexible section of the bottom member of the hatch plate is defined by an annular member having an inner perimeter portion and an outer perimeter portion spaced away from the inner perimeter portion in a radial direction by a central portion and wherein the hatch plate includes a rigid inner spacer element that is disposed between the top member of the hatch plate and the inner perimeter portion of the resiliently flexible section of the bottom member, the inner perimeter portion of the resiliently flexible section of the bottom member being held between the retention ring and the rigid inner spacer element and thereby restrained from movement in both the axial and radial directions.

* * * * *